(12) United States Patent
Narita (10) Patent No.: US 8,823,984 B2
(45) Date of Patent: Sep. 2, 2014

(54) IMAGE PROCESSING APPARATUS, CONTROLLING METHOD OF IMAGE PROCESSING APPARATUS, AND PROGRAM

(75) Inventor: Tateki Narita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 13/435,528

(22) Filed: Mar. 30, 2012

(65) Prior Publication Data

US 2012/0257241 A1 Oct. 11, 2012

(30) Foreign Application Priority Data

Apr. 6, 2011 (JP) ................. 2011-084769

(51) Int. Cl.
*G06K 15/00* (2006.01)
*G06F 3/12* (2006.01)

(52) U.S. Cl.
USPC .......................................... 358/1.15; 358/1.1

(58) Field of Classification Search
None
See application file for complete search history.

(56) References Cited

U.S. PATENT DOCUMENTS

2009/0310178 A1* 12/2009 Tomita et al. ................. 358/1.15
2010/0284032 A1* 11/2010 Furukawa et al. ........... 358/1.14

FOREIGN PATENT DOCUMENTS

JP 05-165827 A 7/1993

* cited by examiner

*Primary Examiner* — Marcus T Riley
(74) *Attorney, Agent, or Firm* — Fitzpatrick, Cella, Harper & Scinto (57) ABSTRACT

The present invention relates to a constitution of an image processing apparatus which holds a job to be received to a volatile memory and processes the held job, comprising: a non-volatile memory; a setting unit configured to set a transition condition for transitioning a power supply for the volatile memory to an off state and a holding condition for holding a specific job in the non-volatile memory; and a controlling unit configured to save, before transitioning the power supply to the volatile memory to the off state according to the transition condition, the specific job held in the volatile memory to the non-volatile memory so as to satisfy the holding condition, and then transition the power supply for the volatile memory to the off state according to the transition condition.

8 Claims, 7 Drawing Sheets

FIG. 6B

IMAGE PROCESSING APPARATUS, CONTROLLING METHOD OF IMAGE PROCESSING APPARATUS, AND PROGRAM

BACKGROUND OF THE INVENTION

1. Field of the Invention

The present invention relates to an image processing apparatus which has an automatic power-off function, a controlling method which controls the image processing apparatus, and a program which is used to perform the controlling method.

2. Description of the Related Art

In general, an image processing apparatus which has a printing function and/or a reading function further has a power saving function for cutting off power supplied to each of hardware units such as a printer engine, a scanner engine, an operation unit screen and the like and transitioning its operation state to a sleep state in a case where an operation request is not sent from a user for a certain period of time or more. Here, in a case where the operation request is sent via a communication protocol with an external interface or from an operation unit in the sleep state, then the image processing apparatus restarts to supply the power to each of the necessary hardware units and thus performs the operation requested. Incidentally, when the image processing apparatus is in the sleep state, the image processing apparatus supplies certain power to a part of the external interface such as an Ethernet™ interface, a USB (universal serial bus) interface or the like, or to a part of the operation unit, so as to detect the operation request to be sent. Moreover, when data being processed remains in a volatile memory, the image processing apparatus supplies certain power to the volatile memory so as to hold or maintain the data.

Incidentally, further power saving is currently promoted in regard to the above power saving function, and, in this connection, a study for an automatic power-off function which transitions the image processing apparatus to a power-off state in a case where an operation request is not sent from a user for a certain period of time or more has been carried out.

By the automatic power-off function, since the power to be supplied to the external interface or the volatile memory is reduced, consumed power becomes approximately "zero". However, in a case where the data being processed remains in the volatile memory when the automatic power-off function is actually used, it becomes necessary to save (or evacuate) the data remaining in the volatile memory.

Conventionally, as disclosed in Japanese Patent Application Laid-Open No. H05-165827, in the power-off process, the data being processed is once compressed, and then the compressed data is saved to an external storage apparatus, a non-volatile memory, or a battery-backup volatile memory.

SUMMARY OF THE INVENTION

Incidentally, in an image processing apparatus which has a secure print function to once store externally received print image data in the image processing apparatus itself and then perform printing of the stored print image data in response to an authentication operation by a user, when only a volatile memory is provided to save the data in an automatic power-off state, a job to which an authentication process is necessary is erased in the power-off state without a user's intention even if such a data saving method as disclosed in Japanese Patent Application Laid-Open No. H05-165827. is applied.

On the other hand, in order to avoid such an inconvenient state that the job is erased without the user's intention, it is conceivable to control to stop performing the automatic power-off. In this case, a period of time for transitioning to power saving is prolonged, whereby it is impossible to achieve an effective power saving process. That is, in the conventional power saving control, there is a problem that it is difficult to achieve the power saving while ensuring that the job held in the volatile memory is not erased.

The present invention has been completed to solve the above problem, and an object thereof is to provide a mechanism by which, in a case where a state that a job is not received to a volatile memory continues, even when a specific job is received, it is possible to transition a power supply for supplying power to the volatile memory to an off state with proper timing without erasing the received specific job.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

<Description of System Configuration>

[First Embodiment]

Figure 1:
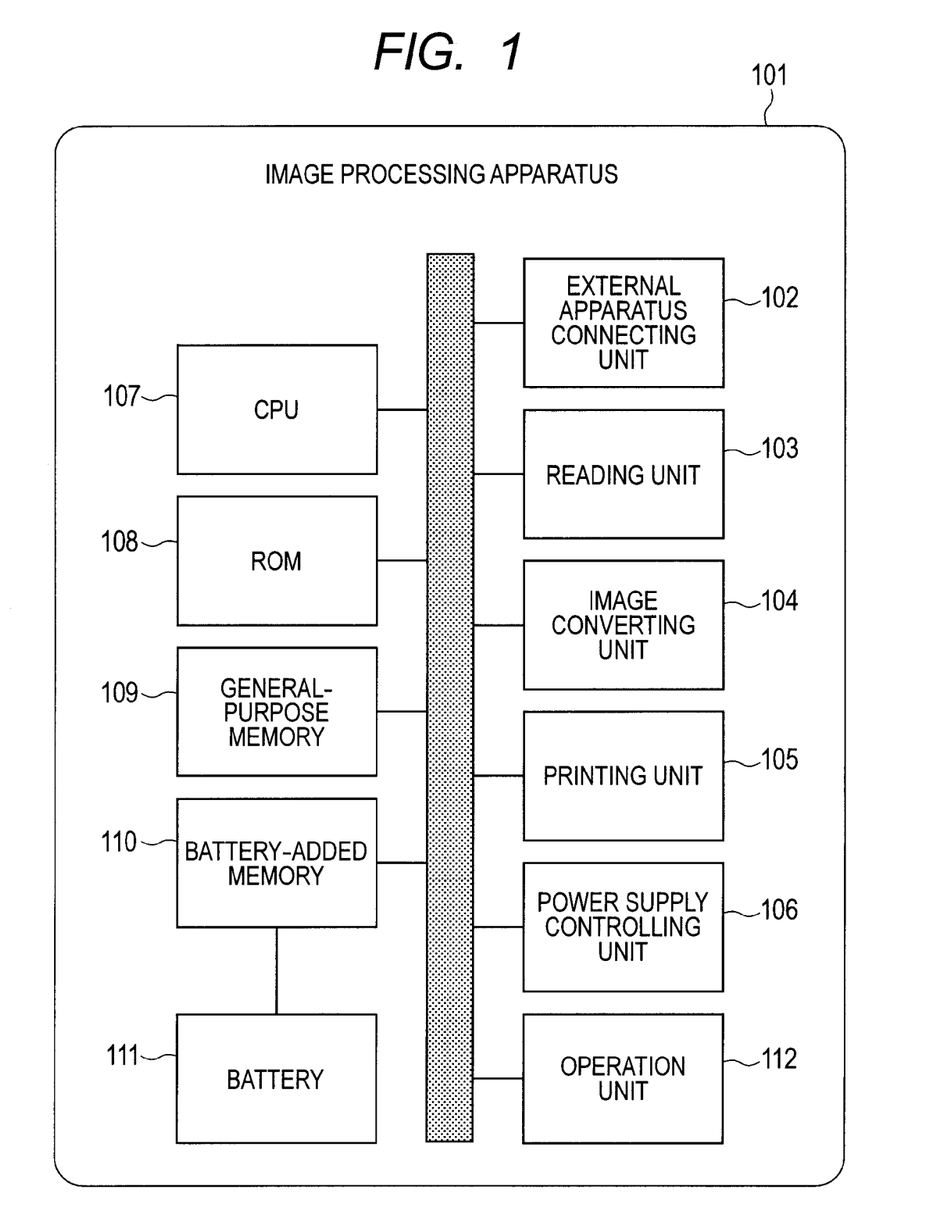
FIG. 1 is a block diagram for describing a constitution of an image processing apparatus according to an embodiment of the present invention.

FIG. 1 is a block diagram for describing a constitution of an image processing apparatus according to the present embodiment. Here, it should be noted that this drawing shows an example of an image processing apparatus 101 which has a secure print function and can perform power saving control.

Hereinafter, a hardware constitution of the present invention will be described.

In FIG. 1, an external apparatus connecting unit 102 transmits and receives various data to and from an external apparatus through a LAN (local area network), a USB (universal serial bus) or a telephone line connection, thereby receiving image data or the like. Moreover, the external apparatus connecting unit 102 notifies a user who uses the external apparatus, of necessary information. A reading unit 103 optically reads an image on an original made of a paper medium, and converts the read image into image data.

An image converting unit 104 performs predetermined image processes such as color space conversion, color density conversion and the like to the image data obtained by the external apparatus connecting unit 102 and the reading unit 103, and generates print image data based on the processed image data. A printing unit 105 prints, on a paper medium, the print image data generated by the image converting unit 104.

A power supply controlling unit 106 controls power supply to each of the units arranged in the image processing apparatus. A CPU (central processing unit) 107 performs various image processes, a data communication process, a power saving control, and a process by a secure print function, by executing control programs stored in a ROM (read only memory) 108. A general-purpose memory 109 is constituted by a RAM (random access memory) or the like. A battery-added memory 110, which is backed up by power supplied from a battery 111, serves as a non-volatile memory.

Incidentally, the CPU 107 serves as the controlling unit of the image processing apparatus 101, and thus controls the apparatus totally.

Further, since the general-purpose memory 109 and the battery-added memory 110 are volatile memories in which variables of the control programs of the CPU 107, and the image data are stored, any data cannot be stored in these memories in a state that power is not supplied from the power supply controlling unit 106.

As described above, since the battery-added memory 110, as well as the general-purpose memory 109, is the volatile memory which stores therein the image data, this memory receives the power supplied from the power supply controlling unit 106. However, in a case where the power supply is switched to the battery 111, the battery-added memory 110 can store and hold the data for a certain time even in a state that the power is not supplied from the power supply controlling unit 106.

The battery 111 performs a charging operation in the state that the power is supplied from the power supply controlling unit 106. On the other hand, the battery 111 supplies the power to the battery-added memory 110 for the certain time in the state that the power is not supplied from the power supply controlling unit. An operation unit 112, which includes thereon a UI (user interface) such as buttons, a display panel and the like, accepts an operation request from a user, and notifies the user of the information transferred from the image processing apparatus 101.

The image processing apparatus, which is constituted to have the volatile memory (general-purpose memory) and the non-volatile memory (battery-added memory) for holding jobs to be received, performs following functional processes.

Figure 5:
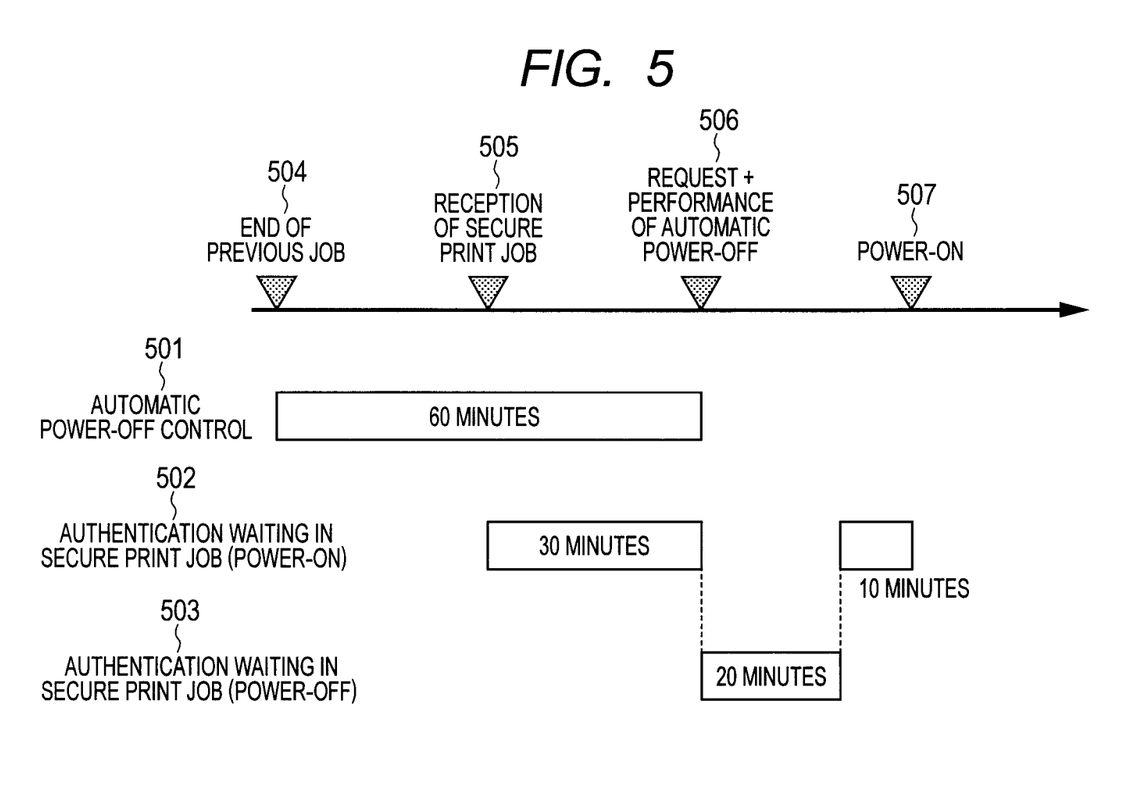
FIG. 5 is a timing chart for describing another operation to be performed by the image processing apparatus according to the present invention.

That is, a transition condition for transitioning the power supply set by the user for the general-purpose memory to an off state and a holding condition for holding a specific job in the battery-added memory are held by, e.g., the battery-added memory. Then, as illustrated in FIG. 5, after the process of the job was completed, when it is discriminated that the transition condition (transition time=60 minutes) is satisfied, the power supply controlling unit 106 transitions the power supply for the general-purpose memory to the off state. Here, it should be noted that the holding condition includes a holding time for holding the specific job.

Here, before the transition time elapses, it is discriminated by the power supply controlling unit 106 whether or not the specific job (that is, a secure print job to which an authentication process is performed) has been held in the general-purpose memory. Then, when it is discriminated that the specific job has been held in the general-purpose memory, the secure print job is saved to the battery-added memory by the CPU 107. Subsequently, when a request issued by the user to transition the power supply to an on state is accepted, the secure print job saved and held in the battery-added memory is restored to the general-purpose memory by the power supply controlling unit 106. In any case, the detail of the above process will be described with reference to flow charts illustrated in FIGS. 6A and 6B. First, concrete power saving control to be performed conventionally in an image processing apparatus will be described hereinafter with reference to FIGS. 2 and 3.

(Conventional Power Saving Control)

Figure 2:
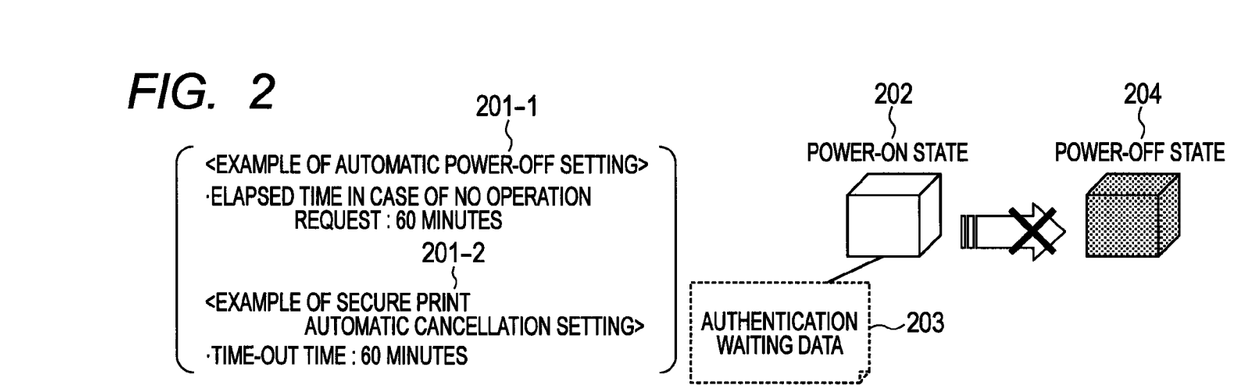
FIG. 2 is a diagram for describing power saving control and secure print control of the image processing apparatus according to the present invention.

FIG. 2 is the diagram for describing a correspondence between power saving control and secure print control to be performed to this kind of image processing apparatus.

Here, it should be noted that the illustrated example is equivalent to a state that an automatic power-off function and an automatic job cancellation function overlap.

In FIG. 2, automatic power-off setting 201-1 indicates a state that automatic power-off is set after a lapse of, e.g., 60 minutes, and secure print automatic job cancellation setting 201-2 indicates a state that automatic job cancellation in secure print is set after a lapse of, e.g., 60 minutes. In a power-on state 202, the automatic power-off is triggered by a lapse of a set time. For example, when an operation request is not issued from a user for a certain time (60 minutes) or more, the automatic power-off is performed. Thus, the image processing apparatus enters a power-off state 204.

On another front, in the secure print job, for example, automatic cancellation is performed after a lapse of a previously set time-out time (60 minutes) from acceptance of authentication waiting data 203 by the image processing apparatus 101. Here, it should be noted that the authentication waiting data 203 includes the secure print job.

When the secure print job transmitted from the external apparatus is accepted by the image processing apparatus 101, the authentication waiting data 203 of the accepted secure print job is held in the general-purpose memory 109 being the volatile memory in the power-on state 202.

When the automatic power-off is performed at this time, the power supply to the general-purpose memory 109 is stopped. Thus, the authentication waiting data 203 is erased, whereby the job is canceled without a user's intention before the time-out time set in the secure print job elapses. For this reason, it is controlled by the image processing apparatus to stop or delay the performance of the automatic power-off. Hereinafter, a concrete example of such control will be described with reference to FIG. 3.

Figure 3:
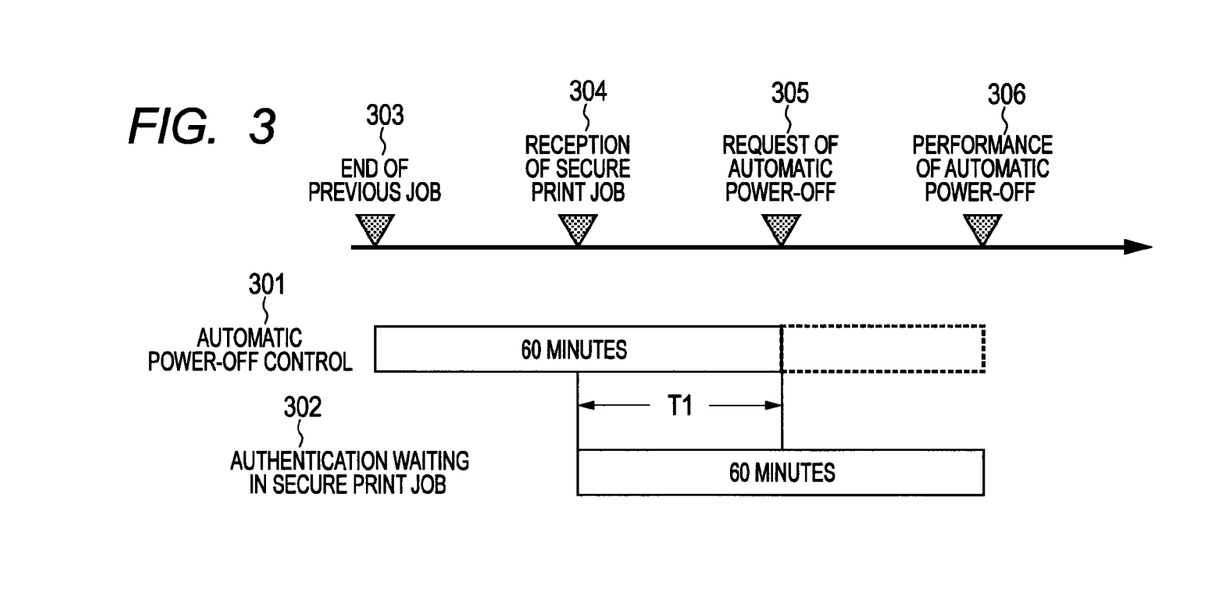
FIG. 3 is a timing chart for describing an operation to be performed by the image processing apparatus according to the present invention.

FIG. 3 is the timing chart for describing control timing of the automatic power-off to be performed by the image processing apparatus 101 in the example of FIG. 2.

Here, it should be noted that FIG. 3 includes a timing chart 301 indicating the automatic power-off control, and a timing chart 302 indicating an authentication waiting state in the secure print job.

Incidentally, the automatic power-off and the automatic cancellation in the secure print job are set by using the automatic power-off setting 201-1. Here, timing 303 is equivalent to timing with which a job to be performed prior to the secure print job is completed. That is, when the operation request is not issued from the user for the certain time from this timing, the automatic power-off is requested from the image processing apparatus 101 to the power supply controlling unit 106.

Further, timing 304 is equivalent to timing with which the secure print job is received. With this timing, the received image data is stored in the general-purpose memory 109 by the image processing apparatus 101, and the stored image data is held as the authentication waiting data during the set time-out time.

Furthermore, timing 305 is equivalent to timing with which the request of the automatic power-off is output. In any case, when the operation request for the functional process concerning the image processing apparatus 101 is not issued from the user, the request of the automatic power-off is output after a lapse of a certain time from the timing 303.

When the authentication waiting data is held by the image processing apparatus 101 with the timing 305 of requesting the automatic power-off, the performance of the automatic power-off is stopped or delayed. Here, when the performance of the automatic power-off is delayed, as indicated by the timing chart 302, the authentication waiting state in the secure print job continues up to timing 306 with which the automatic power-off is performed in the automatic cancellation. In other words, as illustrated in FIG. 3, when the secure print job is received during the period from the timing 303 to the timing 305, the automatic power-off timing is delayed for a time obtained by subtracting a difference time T1 between the timing 304 and the timing 305 from 60 minutes.

In the case where the control as described with reference to FIGS. 2 and 3 is performed, the timing with which the automatic power-off is to be performed is delayed when the automatic power-off function and the automatic job cancellation function overlap, whereby power consumption increases. Consequently, in the present embodiment, the authentication waiting data which has been held in the general-purpose memory 109 is once saved to the battery-added memory 110, and then the automatic power-off is performed with the timing between the timing 305 and the timing 306, thereby reducing the power consumption.

Here, the battery-added memory 110 is mainly used to back up the facsimile image data received from the external apparatus connecting unit 102. However, when a sufficient free space still remains in the battery-added memory at the time when the automatic power-off is performed, the relevant space can be used for the data saving.

(First Power Saving Control)

Figure 4:
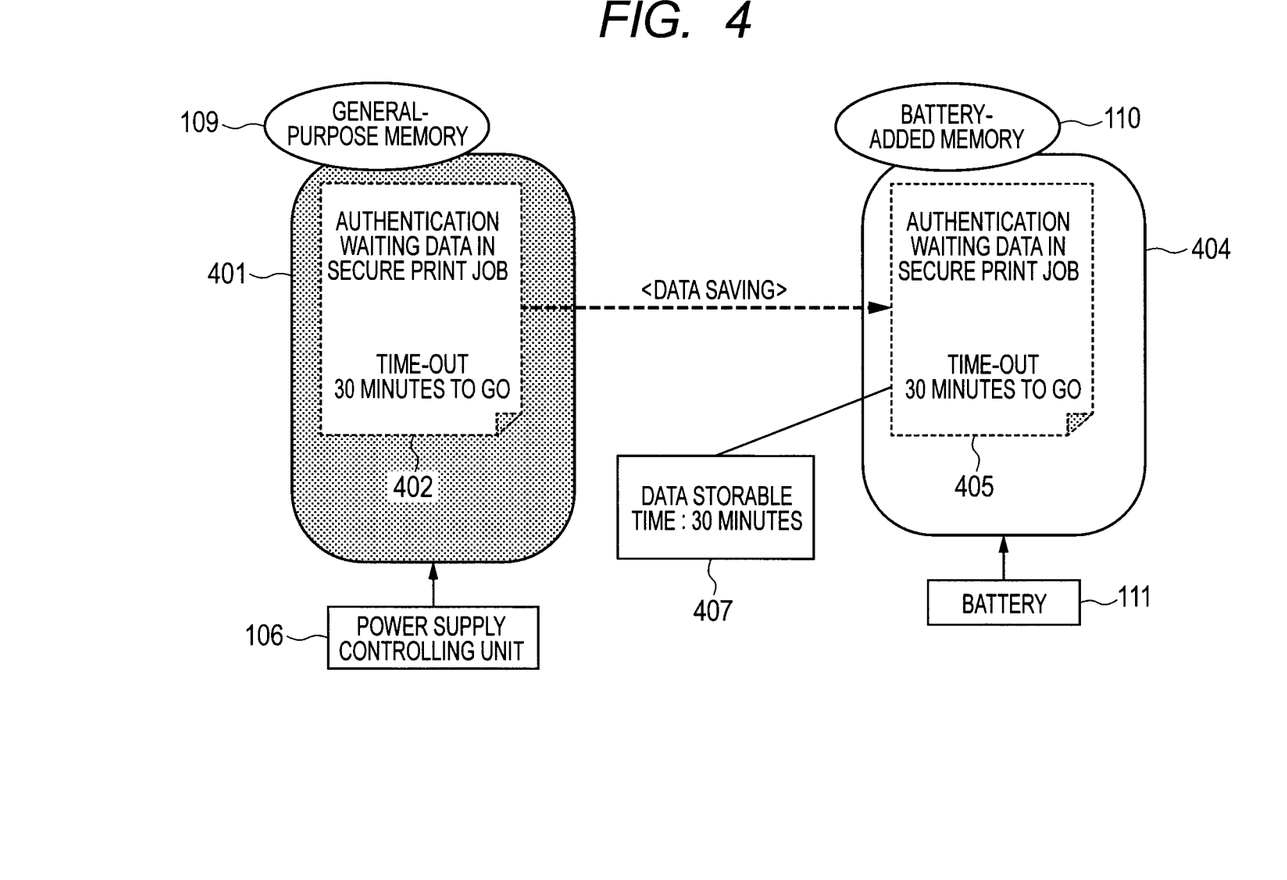
FIG. 4 is a diagram for describing an example of a data saving process to be performed in the image processing apparatus according to the present invention.

FIG. 4 is a diagram for describing an example of a data saving process to be performed in the image processing apparatus 101 illustrated in FIG. 1. Here, it should be noted that, in this example, the authentication waiting data which has been held in the general-purpose memory 109 is saved to the battery-added memory 110.

FIG. 4 describes a state that, in a memory area 401, authentication waiting data 402 in the secure print job has been held in the general-purpose memory 109. Here, it is assumed that, for the authentication waiting data 402, a remaining time-out time up to the automatic cancellation is set to 30 minutes.

The power supply to the general-purpose memory 109 is stopped by the power supply controlling unit 106 with timing 506 of performing automatic power-off indicated by the timing chart illustrated in FIG. 5.

Further, it is indicated that data holding can be performed by a memory area 404 in the battery-added memory 110 for a certain time due to the power supply from the battery 111 even after the automatic power-off was performed. Furthermore, a data storable time 407 indicates a time state that the saved data can be stored and held by the power supply from the battery 111. In the present embodiment, for example, a case where the data storable time 407 is equivalent to 30 minutes (corresponding to the time-out time) is shown.

In the case where the request of the automatic power-off is issued, when the remaining time-out time of the authentication waiting data 402 is within the data storable time, the authentication waiting data 402 is saved to the memory area 404 in the battery-added memory 110 by the image processing apparatus 101, whereby authentication waiting data 405 is stored.

Further, in the case where the power supply from the power supply controlling unit 106 is restored, when there is the remaining time-out time of the authentication waiting data 405, the authentication waiting data 405 is again stored as the authentication waiting data 402 in the memory area 401 of the general-purpose memory 109 by the image processing apparatus 101, whereby the data restoration is performed. FIG. 5 is the timing chart for describing an operation to be performed by the image processing apparatus according to the present embodiment. Here, it should be noted that this timing chart is equivalent to an example of controlling of the execution of the automatic power-off.

Here, it should be noted that FIG. 5 includes a timing chart 501 indicating the automatic power-off control, a timing chart 502 indicating an authentication waiting state in the secure print job in the power-off state, and a timing chart 503 indicating an authentication waiting state in the secure print job in the power-on state.

Incidentally, the automatic power-off setting 201-1 and the secure print automatic job cancellation setting 201-2 are used as the settings of the automatic power-off and the automatic cancellation in the secure print job.

Here, timing 504 is equivalent to timing with which a job to be performed prior to the secure print job is completed. That is, when the operation request is not issued from the user for the certain time from this timing, the automatic power-off is requested from the image processing apparatus 101 to the power supply controlling unit 106.

Further, timing 505 is equivalent to timing with which the secure print job is received. With this timing, the received image data is stored in the general-purpose memory 109 by the image processing apparatus 101, and the stored image data is held as the authentication waiting data during the set time-out time.

Furthermore, the timing 506 is equivalent to timing with which the automatic power-off is requested and performed. When the operation request for the image processing apparatus 101 is not accepted, this timing occurs after a lapse of a certain time from the timing 504. With the timing 506 of the request and the performance of the automatic power-off, the authentication waiting data in the general-purpose memory 109 is saved to the battery-added memory 110 by the CPU 107 of the image processing apparatus 101, whereby the image processing apparatus 101 transitions to the power-off state.

Furthermore, timing 507 is equivalent to timing with which the power supply is turned on. When the user operates the operation unit 112 or the like with this timing, the request for the power supply controlling unit 106 is notified. Incidentally, when the power-on timing 507 occurs while the timing chart 503 indicating the authentication waiting state of the secure print job in the power-on state is continuing, it is controlled by the CPU 107 of the image processing apparatus 101 to restore the authentication waiting data in the battery-added memory 110 to the general-purpose memory 109.

Figure 6A:
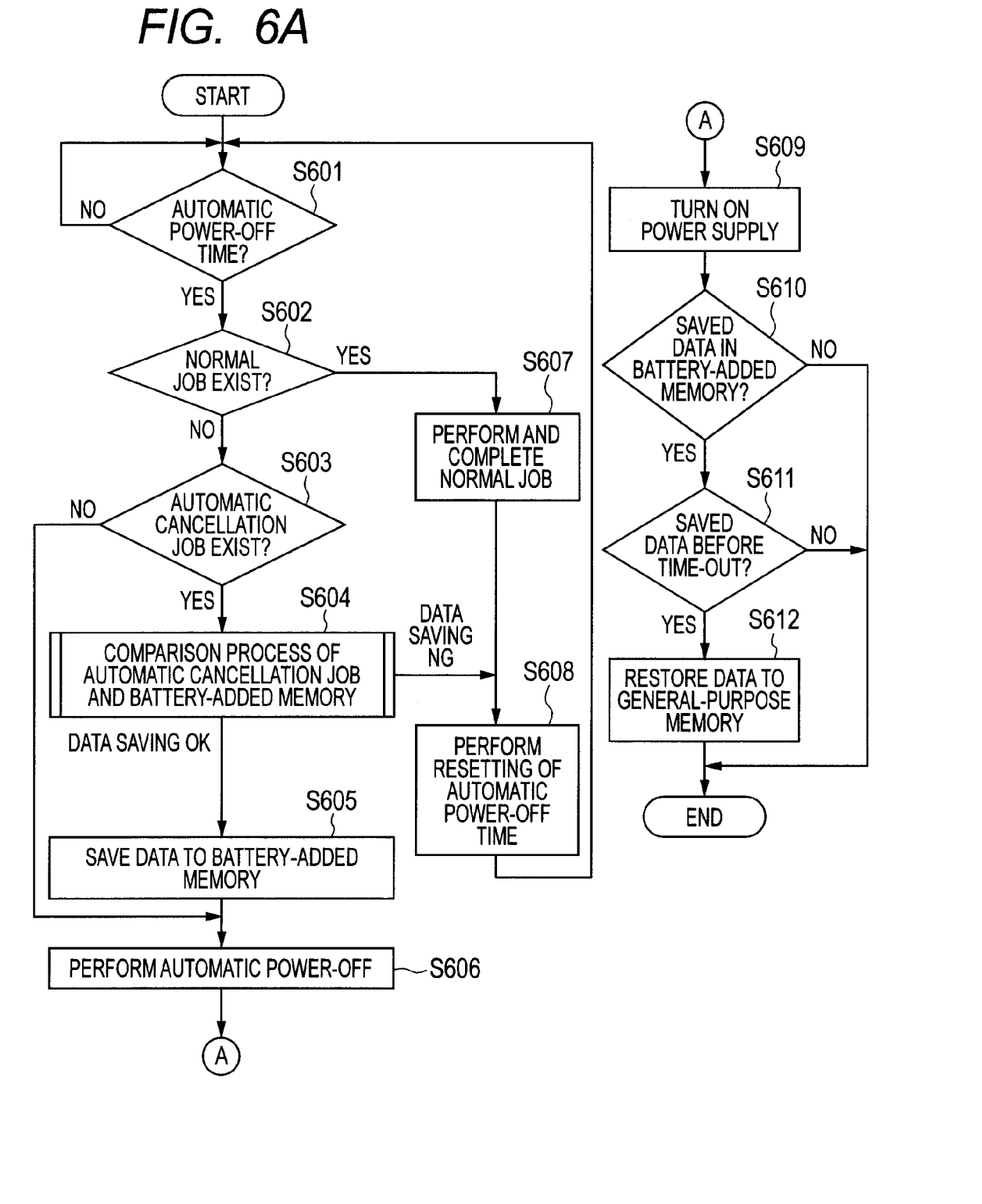
FIGS. 6A and 6B are flow charts for describing a controlling method of the image processing apparatus according to the present invention.
Figure 6B:
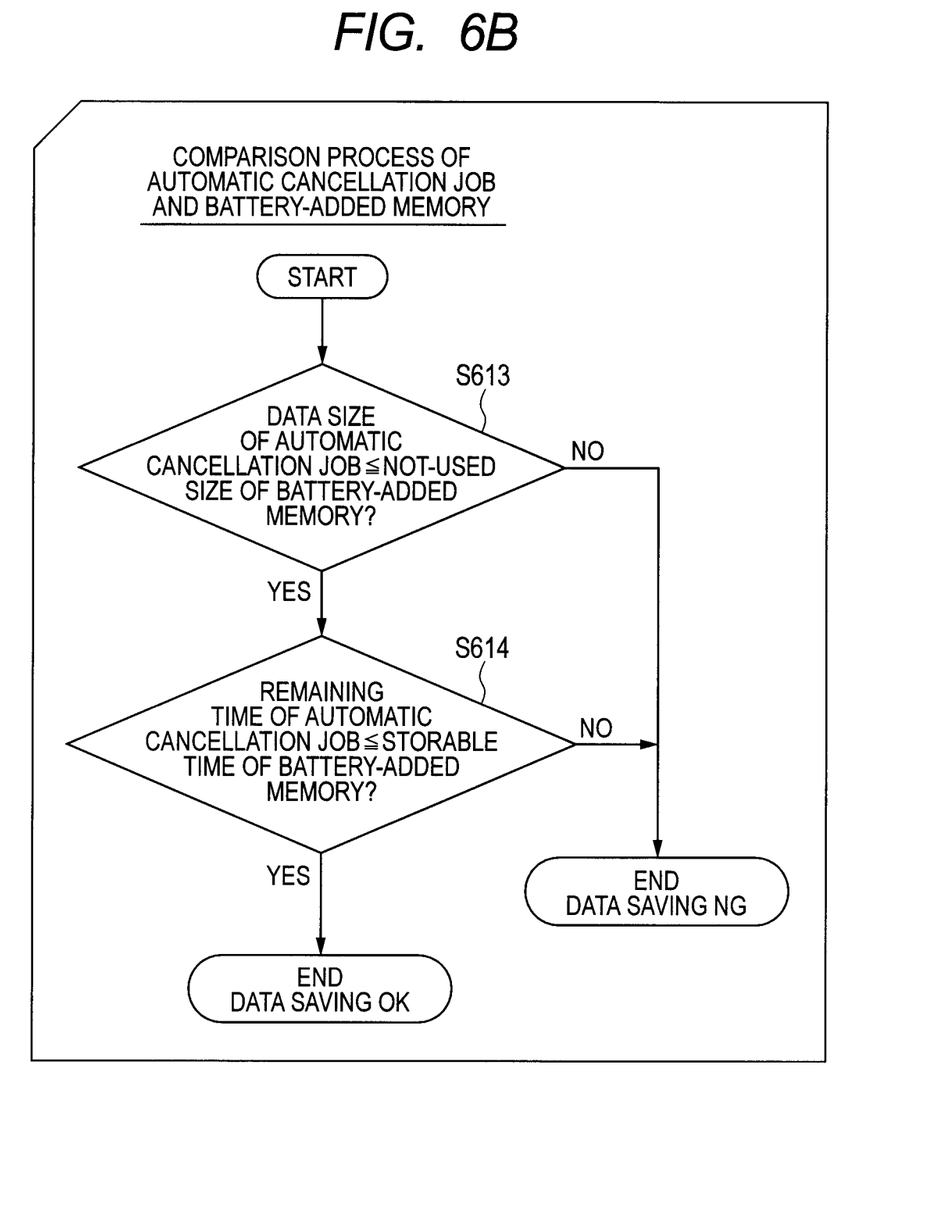

FIGS. 6A and 6B are the flow charts for describing an example of the controlling method of the image processing apparatus according to the present embodiment. Here, it should be noted that this example is equivalent to an example of control in case of performing first automatic power-off. Incidentally, the respective steps in the flow charts are achieved when the CPU 107 loads the control programs stored in the ROM 108 to the general-purpose memory 109 and executes the loaded programs. Further, the process entirely illustrated in the flow chart of FIG. 6A is performed as a main process, and the process illustrated in the flow chart of FIG. 6B is performed as a subroutine of the process of FIG. 6A.

Initially, in a step S601, the time of the occurrence of the automatic power-off based on the setting of the automatic power-off is monitored by the CPU 107 from the timing 504 of the completion of the prior job. Subsequently, when the time of the occurrence of the automatic power-off is discriminated by the CPU 107, the procedure is advanced to a step S602.

Then, in the step S602, it is discriminated by the CPU 107 whether or not a normal job which is not an automatic cancellation job such as the secure print job exists in the general-purpose memory 109. When it is discriminated by the CPU 107 that the normal job which is not the automatic cancellation job does not exist in the general-purpose memory, the procedure goes to a step S603. On the other hand, when it is discriminated that the normal job exists in the general-purpose memory, the procedure is advanced to a step S607.

In the step S607, the normal job which exists in the general-purpose memory 109 is performed by the CPU 107. Then, when the process of the normal job is completed, the procedure is advanced to a step S608. In this step, the time of the occurrence of the automatic power-off based on the setting of the automatic power-off is re-set on the general-purpose memory 109 by the CPU 107, and the procedure is returned to the step S601.

On the other hand, when the procedure was advanced to the step S603, it is further discriminated by the CPU 107 whether or not the automatic cancellation job exists in the general-purpose memory 109. When it is discriminated by the CPU 107 that the automatic cancellation job exists in the general-purpose memory, the procedure is advanced to a step S604. On the other hand, when it is discriminated that the automatic cancellation job does not exist in the general-purpose memory, the procedure is advanced to a step S606. In this step, the automatic power-off is performed by the CPU 107, and the procedure is further advanced to a step S609.

In the step S604, a comparison process of the automatic cancellation job and the battery-added memory 110 is performed by the CPU 107, and it is discriminated based on the result of the comparison process whether or not all the data of the received automatic cancellation job can be saved in the battery-added memory 110. Then, when it is discriminated by the CPU 107 that all the data of the received automatic cancellation job can be saved in the battery-added memory, the procedure is advanced to a step S605. On the other hand, when it is discriminated by the CPU 107 that all the data of the received automatic cancellation job cannot be saved in the battery-added memory, the procedure is advanced to the step S608. In this step, the time of the occurrence of the automatic power-off is re-set, and the procedure is returned to the step S601.

In the step S605, the image data of the automatic cancellation job are saved in the battery-added memory 110 by the CPU 107. Then, in the step S606, the automatic power-off is performed by the power supply controlling unit 106 according to the instruction issued from the CPU 107, and the procedure is advanced to the step S609.

In the step S609, when it is discriminated by the power supply controlling unit 106 that the request of the automatic power-on due to a user's operation or the like is accepted with the timing 507 illustrated in FIG. 5, the procedure is advanced to a step S610.

Then, in the step S610, it is discriminated by the CPU 107 whether or not the image data saved in the step S605 exists in the battery-added memory 110. When it is discriminated that the saved image data does not exist in the battery-added memory, the process is completed.

On the other hand, when it is discriminated by the CPU 107 that the saved image data exists in the battery-added memory, the procedure is advanced to a step S611. In this step, it is discriminated by the CPU 107 whether or not the image data saved in the battery-added memory 110 is before time-out. When it is discriminated that the saved image data is not before the time-out, the specific job held in the battery-added memory 110 is discarded, and then the process is completed. Here, it should be noted that the specific job includes the secure print job to which the authentication process is performed.

On the other hand, when it is discriminated in the step S611 that the saved image data is before the time-out, the procedure is advanced to a step S612. In this step, the image data saved in the battery-added memory 110 is restored to the general-purpose memory 109, and the process is completed.

Hereinafter, the detail of the process to be performed in the step S604 will be described with reference to the flow chart illustrated in FIG. 6B. Incidentally, the respective steps in this flow chart are achieved when the CPU 107 loads the control program stored in the ROM 108 to the general-purpose memory 109 and executes the loaded program.

Here, processes to be performed in steps S613 and S614 are equivalent to the detail of the process to be performed in the step S604.

In the step S613, the data size of the image data of the automatic cancellation job and the not-used size (i.e., the size of the free space) in the battery-added memory are compared with each other by the CPU 107, and it is thus discriminated whether or not the not-used size of the battery-added memory is larger than the data size of the image data. When it is discriminated by the CPU 107 that the not-used size of the battery-added memory is smaller than the data size of the image data, it is determined that the data saving cannot be performed. Thus, "DATA SAVING NG" is generated, and the procedure is advanced to the step S608.

On the other hand, when it is discriminated by the CPU 107 in the step S613 that the not-used size of the battery-added memory is larger than the data size of the image data, the procedure is advanced to the step S614. In this step, the remaining time-out time of the automatic cancellation job and the storable time of the battery-added memory (that is, the time during which the battery-added memory can store data) are compared with each other by the CPU 107, and it is thus discriminated whether or not the storable time of the battery-added memory is larger (longer) than the remaining time-out time of the automatic cancellation job. When it is discriminated by the CPU 107 that the storable time is larger than the remaining time-out time, it is determined that the data saving can be performed, and the procedure is advanced to the step S605.

On the contrary, when it is discriminated by the CPU 107 in the step S614 that the storable time is smaller than the remaining time-out time, it is determined that the data saving cannot be performed. Thus, "DATA SAVING NG" is generated, and the procedure is advanced to the step S608.

It is possible by the above procedure to save the authentication waiting data of the secure print job held in the volatile memory to the battery-added memory with appropriate timing, and thus achieve the power saving while ensuring the holding of the data.

[Second Embodiment]

Hereinafter, the second embodiment will be described. In the second embodiment, in the control of the performance of the automatic power-off, the state of the automatic cancellation job is notified to a user when the automatic power-off and the power-on are performed.

(Second Power Saving Control)

Figure 7:
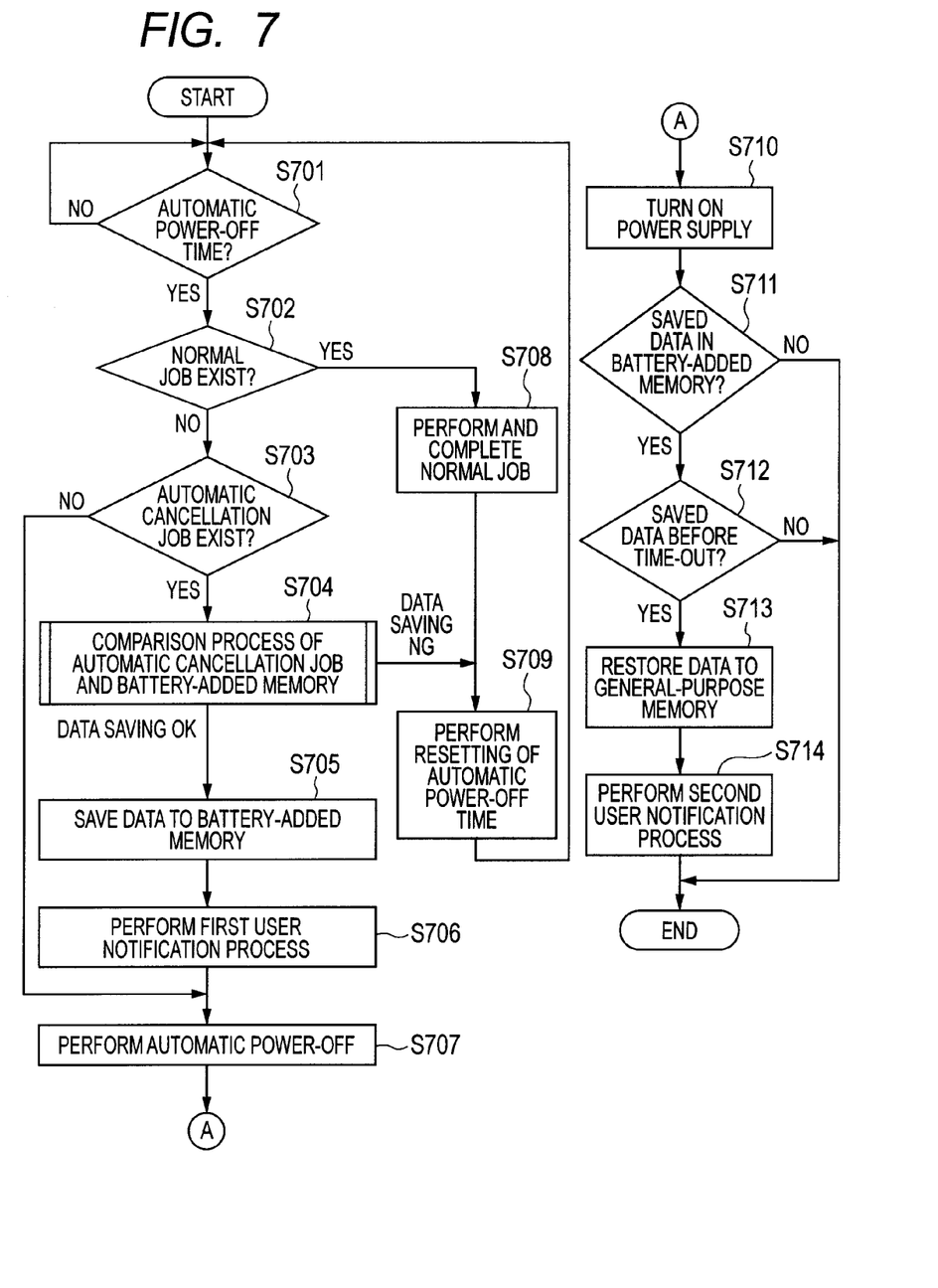
FIG. 7 is a flow chart for describing another controlling method of the image processing apparatus according to the present invention.

FIG. 7 is a flow chart for describing an example of the controlling method of the image processing apparatus according to the present embodiment. Here, it should be noted that this example is equivalent to an example of control in case of performing second automatic power-off.

Incidentally, the respective steps in the flow chart are achieved when the CPU 107 loads the control program stored in the ROM 108 to the general-purpose memory 109 and executes the loaded program. Further, the process illustrated in the flow chart of FIG. 7 is performed as a main process, and the process illustrated in the flow chart of FIG. 6B is performed as a subroutine of the process of FIG. 7.

Initially, in a step S701, the time of the occurrence of the automatic power-off based on the setting of the automatic power-off is monitored by the CPU 107 from the timing 504 of the completion of the prior job. Subsequently, when the time of the occurrence of the automatic power-off is discriminated by the CPU 107, the procedure is advanced to a step S702.

Then, in the step S702, it is discriminated by the CPU 107 whether or not a normal job which is not the automatic cancellation job such as the secure print job exists in the general-purpose memory 109. When it is discriminated by the CPU 107 that the normal job does not exist in the general-purpose memory, the procedure goes to a step S703. On the other hand, when it is discriminated that the normal job exists in the general-purpose memory, the procedure is advanced to a step S708.

In the step S708, the normal job is performed by the CPU 107. Then, when the process of the normal job is completed, the procedure is advanced to a step S709. In this step, the time of the occurrence of the automatic power-off based on the setting of the automatic power-off is re-set by the CPU 107 after the completion of the normal job, and the procedure is returned to the step S701.

On the other hand, when it is discriminated by the CPU 107 in the step S702 that the normal job does not exist in the general-purpose memory, the procedure is advanced to the step S703. In this step, it is further discriminated by the CPU 107 whether or not the automatic cancellation job exists. When it is discriminated that the automatic cancellation job exists, the procedure is advanced to a step S704. In this step, the processes illustrated in the flow chart of FIG. 6B are performed.

On the other hand, when it is discriminated by the CPU 107 in the step S703 that the automatic cancellation job does not exist, the procedure is advanced to a step S707. In this step, the automatic power-off is performed by the power supply controlling unit 106, and the procedure is further advanced to a step S710.

On the contrary, when it is discriminated by the CPU 107 in the step S703 that the automatic cancellation job exists, the procedure is advanced to the step S704. In this step, the data amount of the automatic cancellation job and the memory free space of the battery-added memory 110 are compared with each other by the CPU 107, and it is thus discriminated based on the result of this comparison whether or not the data of the automatic cancellation job can be saved in the battery-added memory. Then, when it is discriminated by the CPU 107 that the data of the automatic cancellation job can be saved, the procedure is advanced to a step S705. On the other hand, when it is discriminated by the CPU 107 that the data of the received automatic cancellation job cannot be saved, the procedure is advanced to the step S709. Then, in the step S709, the time of the occurrence of the automatic power-off for the power supply controlling unit 106 is re-set by the CPU 107, and the procedure is returned to the step S701.

Further, in the step S705, the image data of the automatic cancellation job held in the general-purpose memory 109 are saved in the battery-added memory 110 by the CPU 107, and the procedure is advanced to a step S706.

In the step S706, a first notifying process is performed by the CPU 107. In this process, the operation unit 112 notifies the user that the automatic power-off is to be performed, and of the remaining time-out time of the automatic cancellation job of which the data were saved in the step S705. Incidentally, the first notifying process to be performed in the step S706 may be a process of causing the external apparatus connecting unit 102 to notify the external apparatus of the above information via data communication.

In the step S710, the state of the power supply is transitioned to the on state in synchronism with the user's operation to be performed to the operation unit 112, so that the power supply controlling unit 106 supplies the power to the respective units.

Then, in a step S711, it is discriminated by the CPU 107 whether or not the image data saved in the step S705 exists in the battery-added memory 110. When it is discriminated by the CPU 107 that the saved image data does not exist in the battery-added memory 110, the process is completed.

On the other hand, when it is discriminated by the CPU 107 in the step S711 that the saved image data exists in the battery-added memory 110, the procedure is advanced to a step S712. Then, in the step S712, it is discriminated by the CPU 107 whether or not the image data saved in the battery-added memory 110 is before time-out. When it is discriminated by the CPU 107 that the saved image data is before the time-out, the procedure is advanced to a step S713. In this step, the image data saved in the battery-added memory 110 is restored to the general-purpose memory 109. More specifically, the CPU 107 performs a process of copying the image data saved in the battery-added memory 110 to a predetermined area in the general-purpose memory 109 and then erasing the image data being the copy source saved in the battery-added memory 110.

Subsequently, in a step S714, a second notifying process is performed by the CPU 107. In this process, the operation unit 112 notifies the user that the automatic power-on has occurred, that the automatic cancellation job exists, and of the remaining time-out time of the automatic cancellation job. Incidentally, the second notifying process to be performed in the step S714 may be a process of causing the external apparatus connecting unit 102 to notify the external apparatus of the above information via data communication.

By the above-described operations, it is possible to have the same effect as that in the first embodiment, and it is also possible to notify the user how the automatic cancellation job is being processed according to the power saving mode.

More specifically, in case of controlling the automatic power-off, it is possible to notify, with appropriate timing, the user of the state of the automatic cancellation job when the automatic power-off is performed and the power supply is turned on.

[Other Embodiments]

Aspects of the present invention can also be realized by a computer of a system or an apparatus (or a device such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments). For this purpose, the program is provided to the computer for example via a network or from a recording medium of various types serving as the memory device (e.g., computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-084769, filed Apr. 6, 2011, which is hereby incorporated by reference herein in its entirety.

What is claimed is:

1. An image processing apparatus, comprising:
a first volatile memory;
a second volatile memory; and
a control unit configured to:
(i) cause the image processing apparatus to operate in a first power state and a second power state, power consumption being lower in the second power state than in the first power state,
wherein, in the second power state, power is supplied to the second volatile memory by a battery and is not supplied to the first volatile memory;
(ii) save a job in the first volatile memory and process the job when a condition for processing the job is satisfied,
(iii) save the job held in the first volatile memory to the second volatile memory and shift the image processing apparatus to the second power state when:
(a) a condition for shifting to the second power state is satisfied, and
(b) a remaining time of automatic cancellation for the job is shorter than a storable time of the second volatile memory for the job, and
(iv) not save the job held in the first volatile memory to the second volatile memory and not shift the image processing apparatus to the second power state, when the remaining time of automatic cancellation is longer than the storable time of the second volatile memory.

2. An image processing apparatus, comprising:
a first volatile memory;
a second volatile memory;
a control unit configured to:
(i) cause the image processing apparatus to operate in a first power state and a second power state, power consumption being lower in the second power state than in the first power state,
wherein, in the second power state, power is supplied to the second volatile memory by a battery and is not supplied to the first volatile memory,
(ii) save a job in the first volatile memory and process the job when a condition for processing the job is satisfied,
(iii) save the job held in the first volatile memory to the second volatile memory and shift the image processing apparatus to the second power state, when a condition for shifting to the second power state is satisfied; and
an accepting unit configured to accept a request to shift to the first power state,
wherein the control unit is further configured to, when the request is accepted by the accepting unit and a remaining time of automatic cancellation for the job has not timed out, shift the image processing apparatus to the first power state and restore the job held in the second volatile memory to the first volatile memory.

3. The image processing apparatus according to claim 1, wherein the job is a secure print job for which an authentication process is needed to process the job.

4. The image processing apparatus according to claim 2, wherein the control unit is further configured to, when the request is accepted by the accepting unit and the remaining time of automatic cancellation for the job has timed out, discard the job held in the second volatile memory.

5. An image processing apparatus, comprising:
a first volatile memory;
a second volatile memory;
a control unit configured to:
(i) cause the image processing apparatus to operate in a first power state and a second power state, power consumption being lower in the second power state than in the first power state,
wherein, in the second power state, power is supplied to the second volatile memory by a battery and is not supplied to the first volatile memory,
(ii) save a job in the first volatile memory and process the job when a condition for processing the job is satisfied,
(ii) save the job held in the first volatile memory to the second volatile memory and shift the image processing apparatus to the second power state, when a condition for shifting to the second power state is satisfied; and
a notifying unit configured to notify that the job held in the first volatile memory has been saved to the second volatile memory.

6. An image processing apparatus, comprising:
a first volatile memory;
a second volatile memory;
a control unit configured to:
(i) cause the image processing apparatus to operate in a first power state and a second power state, power consumption being lower in the second power state than in the first power state,
wherein, in the second power state, power is supplied to the second volatile memory by a battery and is not supplied to the first volatile memory,
(ii) save a job in the first volatile memory and process the job when a condition for processing the job is satisfied,
(ii) save the job held in the first volatile memory to the second volatile memory and shift the image processing apparatus to the second power state, when a condition for shifting to the second power state is satisfied; and
a notifying unit configured to notify that the job held in the second volatile memory has been restored to the first volatile memory.

7. A control method for an image processing apparatus that includes a first volatile memory, a second volatile memory, and a control unit configured to cause the image processing apparatus to operate in a first power state and a second power state, power consumption being lower in the second power state than in the first power state, the method comprising the steps of:
saving a job in the first volatile memory; and
saving the job held in the first volatile memory to the second volatile memory, and shifting the image processing apparatus to the second power state, where power is supplied to the second volatile memory by a battery and power is not supplied to the first volatile memory, when:
  (i) a condition for shifting to the second power state is satisfied, and
  (ii) a remaining time of automatic cancellation for the job is shorter than a storable time of the second volatile memory,
wherein the job saved in first volatile memory is not saved to the second volatile memory and the image processing apparatus is not shifted to the second power state, when the remaining time of automatic cancellation is longer than the storable time of the second volatile memory.

8. A non-transitory computer-readable storage medium which stores a program for causing a computer to perform the controlling method according to claim 7.

* * * * *